US011700442B2

(12) United States Patent
Ju

(10) Patent No.: US 11,700,442 B2
(45) Date of Patent: Jul. 11, 2023

(54) CAMERA MODULE

(71) Applicant: SAMSUNG ELECTRO-MECHANICS CO., LTD., Suwon-si (KR)

(72) Inventor: Ga Yeon Ju, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 4 days.

(21) Appl. No.: 17/353,748

(22) Filed: Jun. 21, 2021

(65) Prior Publication Data

US 2022/0141360 A1 May 5, 2022

(30) Foreign Application Priority Data

Nov. 2, 2020 (KR) ........................ 10-2020-0144185

(51) Int. Cl.

*H04N 23/55* (2023.01)
*H04N 23/52* (2023.01)
*H04N 23/54* (2023.01)

(52) U.S. Cl.

CPC ............. *H04N 23/55* (2023.01); *H04N 23/52* (2023.01); *H04N 23/54* (2023.01)

(58) Field of Classification Search

CPC ............. H04N 5/2254; H04N 5/22521; H04N 5/2253; H04N 5/2252; G03B 17/17; G03B 30/00; G03B 17/04; G02B 7/003

See application file for complete search history.

(56) References Cited

U.S. PATENT DOCUMENTS

| | | | | |
|---|---|---|---|---|
| 2019/0235202 | A1* | 8/2019 | Smyth | G03B 17/17 |
| 2019/0361225 | A1 | 11/2019 | Cho et al. | |
| 2022/0086316 | A1* | 3/2022 | Toriumi | G03B 17/17 |

FOREIGN PATENT DOCUMENTS

| | | | |
|---|---|---|---|
| JP | 2014-119474 | A | 6/2014 |
| KR | 10-1448535 | B1 | 10/2014 |
| KR | 10-2015-0084399 | A | 7/2015 |
| KR | 10-2019-0133586 | A | 12/2019 |
| KR | 10-2020-0012421 | A | 5/2020 |
| KR | 10-2020-0101963 | A | 8/2020 |

OTHER PUBLICATIONS

Korean Office Action dated Dec. 14, 2021, in counterpart Korean Patent Application No. 10-2020-0144185 (8 pages in English and 6 pages in Korean).

* cited by examiner

*Primary Examiner* — Mekonnen D Dagnew
(74) *Attorney, Agent, or Firm* — NSIP Law

(57) ABSTRACT

A camera module includes a first assembly including a first optical path conversion unit and a lens module, a second assembly including a second optical path conversion unit configured to refract or reflect light emitted from the lens module in a direction intersecting an optical axis of the lens module, the second assembly being configured to be coupled to the first assembly, and a third assembly including an image sensor configured to convert light incident through the second optical path conversion unit into an electrical signal.

14 Claims, 9 Drawing Sheets

CAMERA MODULE

CROSS-REFERENCE TO RELATED APPLICATION

This application claims the benefit under 35 USC 119(a) of Korean Patent Application No. 10-2020-0144185 filed on Nov. 2, 2020 in the Korean Intellectual Property Office, the entire disclosure of which is incorporated herein by reference for all purposes.

BACKGROUND

1. Field

The following description relates to a camera module including a plurality of optical path conversion units.

2. Description of Related Art

Camera modules may be mounted on/in electronic devices. For example, a camera module may be mounted on a portable telephone, a notebook computer, or a personal digital assistant (PDA). Since the electronic devices described above generally have a thinner structure, the installation space for the camera module may be relatively narrow.

A camera module includes an optical path converting unit to enable long-distance imaging and to be mounted in a narrow space of an electronic device. For example, a camera module may include one or more prisms. The camera module including an optical path conversion unit needs to match or align the optical axis between the optical path conversion unit and the lens module and between the lens module and the image sensor. For example, a camera module including a plurality of prisms needs to match the optical axes of a first prism and the lens module, the lens module and a second prism, and the second prism and the image sensor. However, in related art camera modules, since the first prism, the lens module, and the second prism are integrally formed in a single body, it may be difficult to align the optical axis between the first prism, the lens module and the second prism.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Examples provide a camera module configured to enable optical axis alignment between a plurality of optical path conversion units and a lens module and between the optical path conversion unit and an image sensor.

In a general aspect, a camera module includes a first assembly including a first optical path conversion unit and a lens module, a second assembly including a second optical path conversion unit configured to refract or reflect light emitted from the lens module in a direction intersecting an optical axis of the lens module, the second assembly being configured to be coupled to the first assembly, and a third assembly including an image sensor configured to convert light incident through the second optical path conversion unit into an electrical signal.

The first assembly may include a first bonding portion bonded to the second assembly, and the second assembly may include a second bonding portion bonded to the first bonding portion.

The camera module may include a bonding member configured to bond the first bonding portion to the second bonding portion.

The second bonding portion and the first bonding portion may have different sizes.

A groove accommodating an adhesive may be disposed in one or both of the first bonding portion and the second bonding portion.

The second assembly may include a first bonding portion bonded to the third assembly, and the third assembly may include a second bonding portion bonded to the first bonding portion.

The camera module may include a shielding member configured to protect two or more of the first assembly, the second assembly, and the third assembly from harmful electromagnetic waves.

In another general aspect, a camera module includes a first assembly including a first optical path conversion unit and a first lens module; a second assembly including a second lens module and a second optical path conversion unit configured to refract or reflect light incident through the first lens module in a direction intersecting a first optical axis of the first lens module, the second assembly being configured to be coupled to the first assembly; and a third assembly including an image sensor configured to convert light incident through the second assembly into an electrical signal.

In another general aspect, a camera module includes a first housing having a first opening configured to receive light along a first optical axis and including a lens module defining a second optical axis and a first converter configured to direct the light received along the first optical axis to the second optical axis; a second housing having a second opening configured to receive light along the second optical axis that has passed through the lens module and including a second converter configured to direct the light received along the second optical axis to a third optical axis; and a third housing having a third opening configured to receive light along the third optical axis and including an image sensor configured to receive the light received along the third optical axis.

wherein the first housing has a fourth opening, and the first housing and the second housing are bonded together such that the fourth opening is adjacent to the second opening.

wherein the second housing has a fifth opening, and the second housing and the third housing are bonded together such that the fifth opening is adjacent to the third opening.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
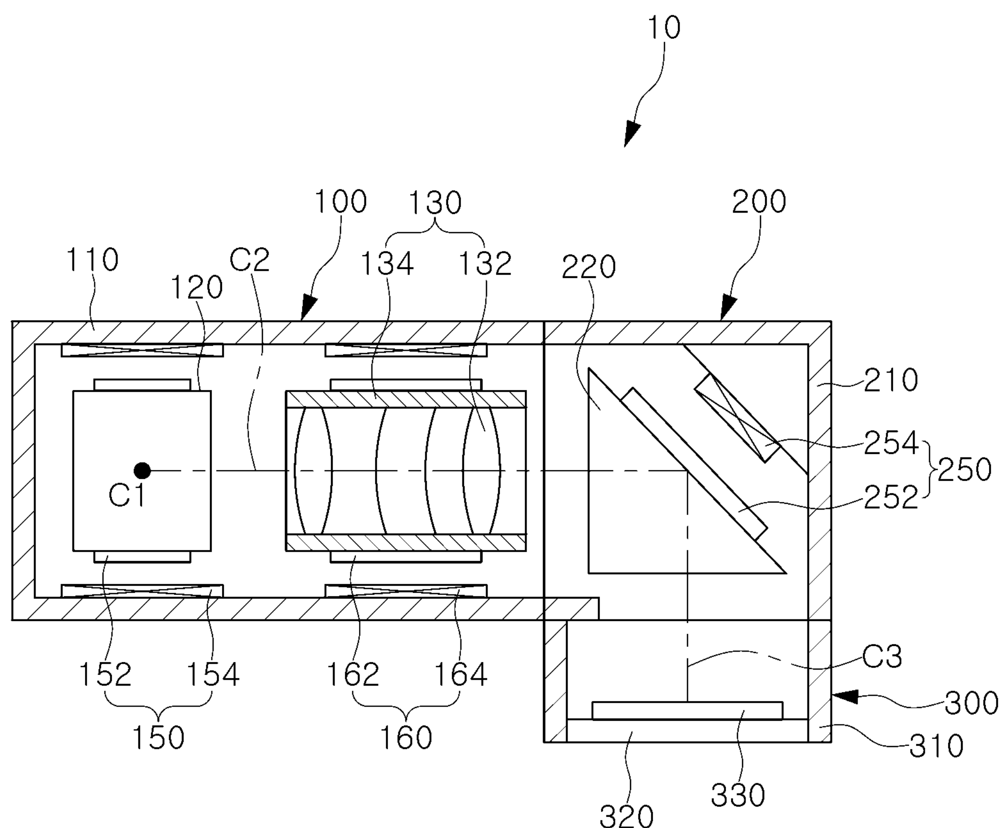
FIG. 1 is a configuration diagram of a camera module according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed, as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is to be noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape occurring during manufacturing.

The features of the examples described herein may be combined in various manners as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative sizes, proportions, and depictions of elements in the drawings may be exaggerated for clarity, illustration, and convenience.

The camera module described herein may be mounted on a portable electronic product. For example, the camera module may be mounted on a portable telephone, a notebook computer, or the like. However, the range of use of the camera module according to the example is not limited to the aforementioned electronic devices. For example, the camera module may be mounted on all electronic devices that require screen imaging and video recording, such as motion detection, image capturing, facial recognition, iris recognition, virtual reality realization, and augmented reality realization.

A camera module according to an example may be configured to be comprised of a plurality of detachable bodies. For example, the camera module may be comprised of a first assembly, a second assembly, and a third assembly. The first assembly to the third assembly may be sequentially combined through the assembly process of the camera module. For example, after the second assembly and the third assembly are combined, the first assembly and the second assembly may be combined. However, the order of combining the various assemblies is not limited to the above-described form.

The first to third assemblies may include one or more components required to perform an imaging function of the camera module. For example, the first assembly may include a first optical path conversion unit and a lens module, the second assembly may include a second optical path conversion unit, and the third assembly may include an image sensor.

The first optical path conversion unit is configured to convert the optical path. For example, the first optical path conversion unit may refract or reflect a path of light incident through an entrance pupil (or opening) of the camera module in the direction of the optical axis of the lens module. The first optical path conversion unit may be formed of a prism, a reflector, or the like.

The lens module may include one or more lenses. For example, the lens module may be comprised of four or more lenses. However, the number of lenses constituting the lens module is not limited to four. For example, the lens module may also be comprised of 3 or less or 5 or more lenses.

The second optical path conversion unit is configured to convert the optical path similarly to the first optical path conversion unit. For example, the second optical path conversion unit may refract or reflect light emitted from the lens module in a direction intersecting the optical axis of the lens module. The second optical path conversion unit may be formed of a prism, a reflector, or the like.

The image sensor is disposed to focus light refracted or reflected by the second optical path conversion unit, and is configured to convert an optical signal into an electric signal. For example, the image sensor may convert light that is refracted or reflected through the second optical path conversion unit into an electric signal.

The first to third assemblies may include configurations for coupling and optical axis alignment. For example, the first assembly may include a first bonding portion, the second assembly may include a second bonding portion and a third bonding portion, and the third assembly may include a fourth bonding portion.

The first to fourth bonding portions may be configured to enable alignment of the optical axis of the camera module during the coupling process of the first assembly to the third assembly. For example, the first bonding portion and the second bonding portion may be formed to be flat in a direction intersecting the optical axis of the lens module, and the third bonding portion and the fourth bonding portion may be formed to be flat in a direction intersecting the optical axis of the image sensor.

The first to fourth bonding portions may have areas of different sizes. For example, the first bonding portion may have an area different from that of the second bonding portion, and the third bonding portion may have an area different from that of the fourth bonding portion. The first to fourth bonding portions may be joined. For example, the first bonding portion and the second bonding portion, and the third bonding portion and the fourth bonding portion may be firmly coupled by an adhesive.

The first to fourth bonding portions may include a configuration for blocking or reducing the inflow of the adhesive member into the interior. For example, grooves for accommodating the adhesive may be formed in the first to fourth bonding portions.

The camera module may be configured to enable optical axis alignment through movement of the first assembly to the third assembly. For example, the first assembly or the second assembly may be moved in a direction intersecting the optical axis along the first bonding portion or the second bonding portion, such that the optical axis of the first assembly (the optical axis of the lens module) and the optical axis of the second assembly (the optical axis of the incident surface of the second optical path conversion unit) may be matched within the allowable range. As another example, the second assembly or the third assembly may be moved in a direction intersecting the optical axis along the third bonding portion or the fourth bonding portion, such that the optical axis of the second assembly (the optical axis of the exit surface of the second optical path conversion unit) and the optical axis of the third assembly (the optical axis of the image sensor) may be matched within the allowable range.

The camera module may include a configuration for protecting the first to third assemblies from harmful electromagnetic waves. For example, the camera module may include a shielding member. The shielding member may be configured to cover at least two or more of the first assembly to the third assembly. For example, the shielding member may be configured to cover the first assembly and the second assembly, or may be configured to cover the first to third assemblies. The shielding member may be formed of a metal material to block harmful electromagnetic waves. However, the material of the shielding member is not limited to a metal.

The camera module according to another example may be configured to be comprised of a plurality of detachable bodies. For example, the camera module may be comprised of a first assembly, a second assembly, and a third assembly. The first to third assemblies may include one or more components required to perform an imaging function of the camera module. For example, the first assembly may include a first optical path conversion unit and a first lens module, the second assembly may include a second optical path conversion unit and a second lens module, and the third assembly may include an image sensor.

The first optical path conversion unit is configured to convert the optical path. For example, the first optical path conversion unit may refract or reflect a path of light incident through an entrance pupil (or opening) of the camera module in the direction of the optical axis of the lens module. The first optical path conversion unit may be formed of a prism, a reflector, or the like.

The first lens module may include one or more lenses. For example, the lens module may be comprised of two or more lenses.

The second optical path conversion unit is configured to convert the optical path similarly to the first optical path conversion unit. For example, the second optical path conversion unit may refract or reflect light emitted from the first lens module in a direction intersecting the optical axis of the first lens module. The second optical path conversion unit may be formed of a prism, a reflector, or the like.

The second lens module may include one or more lenses. For example, the lens module may be comprised of two or more lenses.

The image sensor is disposed to focus light emitted from the second lens module, and is configured to convert an optical signal into an electric signal. For example, the image sensor may convert light that is formed as being imaged on an image plane of the image sensor by the second lens module, into an electric signal.

Hereinafter, various examples will be described in detail based on the accompanying drawings.

A camera module according to an example will be described with reference to FIGS. 1 to 9.

A camera module 10 may include a first assembly 100, a second assembly 200, and a third assembly 300. However, the configuration of the camera module 10 is not limited to the first assembly 100 to the third assembly 300. For example, the camera module 10 may further include a separate component for accommodating the first to third assemblies 100 to 300.

The first assembly 100 may include a first housing 110, a first optical path conversion unit 120, and a lens module 130. However, the configuration of the first assembly 100 is not limited to the above-described configurations. As an example, the first assembly 100 may further include a first driving unit 150 for driving the first optical path conversion unit 120. As another example, the first assembly 100 may include a second driving unit 160 for driving the lens module 130.

The first housing 110 is configured to accommodate the first optical path conversion unit 120 and the lens module 130. For example, the first housing 110 may be formed in a substantially rectangular shape so as to integrally accommodate the first optical path conversion unit 120 and the lens module 130, which are sequentially disposed in one direction. At least one surface of the first housing 110 may be formed to have a partially open shape. For example, in the first housing 110, a partial region of one surface on which light is incident, and a partial region of one surface from which light is emitted, may be formed in an open shape.

The first optical path conversion unit 120 is disposed in the first housing 110. The first optical path conversion unit 120 is configured to convert an optical path. For example, the first optical path conversion unit 120 may convert a path of light incident on a first optical axis C1 in the direction of a second optical axis C2. The first optical path conversion unit 120 may be formed to have the form of a prism or a reflector. However, the shape of the first optical path conversion unit 120 is not limited to a prism or a reflector.

The lens module 130 is configured to image light reflected from a subject on an image plane. The lens module 130 may include one or more lenses that determine the focal length of the camera module 10. For example, the lens module 130 may include three or more lenses 132. However, the number of lenses constituting the lens module 130 is not limited to three. For example, the lens module 130 may include 2 or less lenses or 4 or more lenses. The lens module 130 may include a lens barrel 134. The lens barrel 134 is disposed inside of the first housing 110 and may accommodate the one or more lenses 132. The lens barrel 134 may be configured to be drivable. For example, the lens barrel 134 may be configured to move in the direction of the second optical axis C2 inside of the first housing 110. As another example, the lens barrel 134 may be configured to move in a direction intersecting the second optical axis C2. As another example, the lens barrel 134 may be configured to move in the second optical axis C2 and in a direction intersecting the second optical axis C2. However, the lens barrel 134 is not necessarily configured to be driven. For example, the lens barrel 134 may be fixed so as not to move inside of the first housing 110.

The first assembly 100 may further include the first driving unit 150 for driving the first optical path conversion unit 120 to correct the focus position of the camera module 10. The first driving unit 150 may include a first driving magnet 152 and a first driving coil 154. The first driving magnet 152 may be disposed on one surface of the first optical path conversion unit 120, and the first driving coil 154 may be disposed on the first housing 110. However, the arrangement positions of the first driving magnet 152 and the first driving coil 154 are not limited to the above-described form. For example, the first driving magnet 152 may be disposed on the first housing 110 and the first driving coil 154 may be disposed on the first optical path conversion unit 120. The first driving unit 150 may be configured to rotate the first optical path conversion unit 120 within a predetermined range. For example, the first driving unit 150 may rotate the first optical path conversion unit 120 about the first optical axis C1 or a first driving axis parallel to the first optical axis C1. However, the driving direction of the first optical path conversion unit 120 through the first driving unit 150 is not limited to the above-described form. For example, the first driving unit 150 may rotate the first optical path conversion unit 120 about a second driving axis intersecting the first driving axis. The first driving unit 150 configured as described above may reduce a resolution reduction phenomenon caused by hand shaking of the camera module 10 by adjusting the position of the first optical path conversion unit 120.

The first assembly 100 may further include the second driving unit 160 for driving the lens module 130. The second driving unit 160 may include a second driving magnet 162 and a second driving coil 164. The second driving magnet 162 may be disposed on one surface of the lens barrel 130, and the second driving coil 164 may be disposed on the first housing 110. However, the arrangement positions of the second driving magnet 162 and the second driving coil 164 are not limited to the above-described form. For example, the second driving magnet 162 may be disposed on the first housing 110 and the second driving coil 164 may be disposed on the lens barrel 130. The second driving unit 160 may be configured to move the lens barrel 130 substantially in the direction of the second optical axis C2. The second driving unit 160 may drive the lens barrel 130 in the direction of the second optical axis C2 to perform the autofocusing (AF) function of the camera module 10.

The second assembly 200 may include a second housing 210 and a second optical path conversion unit 220. However, the configuration of the second assembly 200 is not limited to the above-described configurations. As an example, the second assembly 200 may further include a filter for blocking light of a specific wavelength.

The second housing 210 is configured to accommodate the second optical path conversion unit 220. The second housing 210 is formed in such a manner that the incident surface and the exit surface of the second optical path conversion unit 220 are exposed externally in a state in which the second optical path conversion unit 220 is received in the second housing 210. For example, at least two side surfaces of the second housing 210 may be partially open such that light may enter and exit through the incident surface and the exit surface of the second optical path conversion unit 220.

The second optical path conversion unit 220 is disposed in the second housing 210. The second optical path conversion unit 220 is configured to convert the optical path. For example, the second optical path conversion unit 220 may convert a path of light incident on the second optical axis C2 in the direction of a third optical axis C3. The second optical path conversion unit 220 may be formed on a plane, on which the optical path of the camera module 10 substantially intersects the first optical axis C1. For example, the second optical path conversion unit 220 may be configured to refract or reflect light incident along the second optical axis C2 in the direction of the third optical axis C3 intersecting the first optical axis C1. The second optical path conversion unit 220 may be formed as a prism or a reflector. However, the shape of the second optical path conversion unit 220 is not limited to a prism or a reflector.

The second assembly 200 may further include a third driving unit 250. For example, the second assembly 200 may further include the third driving unit 250 configured to move the second optical path conversion unit 220. The third driving unit 250 may include a third driving magnet 252 and a third driving coil 254. The third driving magnet 252 may be disposed on one surface of the second optical path conversion unit 220, and the third driving coil 254 may be disposed on the second housing 210. However, the arrangement positions of the third driving magnet 252 and the third driving coil 254 are not limited to the above-described form. For example, the third driving magnet 252 may be disposed on the second housing 210 and the second driving coil 254 may be disposed on the second optical path conversion unit 220. The third driving unit 250 may be configured to rotate the second optical path conversion unit 220 in a predetermined range. For example, the third driving unit 250 may rotate the second optical path conversion unit 220 around a point at which the second optical axis C2 and the third optical axis C3 are intersected or connected. However, the driving direction of the second optical path conversion unit 220 through the third driving unit 250 is not limited to the above-described form. The third driving unit 250 configured as described above may adjust the focal position of the lens module 130 by changing the position of the second optical path conversion unit 220, or may reduce the resolution reduction phenomenon caused by hand shake of the camera module 10.

The third assembly 300 may include a third housing 310, a substrate 320, and an image sensor 330. However, the configuration of the third assembly 300 is not limited to the above-described configurations.

The third housing 310 is configured to accommodate the substrate 320 and the image sensor 330. For example, a substrate 320 and the image sensor 330 may be disposed inside or on one surface of the third housing 310. The third housing 310 may be formed in a shape of a faceted body with open top and bottom. However, the shape of the third housing 310 is not limited to the faceted body.

The substrate 320 may be disposed inside of the third housing 310 or may be coupled to one end of the third housing 310. The substrate 320 may be electrically connected to the first, second, and third driving units 150, 160 and 250. For example, the substrate 320 and the first, second, and third driving units 150, 160 and 250 may be electrically connected to each other through a flexible substrate or a printed electrode formed on the first, second, and third housings 110, 210 and 310. One or more electronic components may be mounted on the substrate 320. For example, a passive element required for driving the camera module 10, and the like, may be mounted on one surface or inside of the substrate 320.

The image sensor 330 is disposed on the substrate 320. The image sensor 330 may be electrically connected to the substrate 320, and may convert an optical signal incident through the first optical path conversion unit 120, the lens module 130 and the second optical path conversion unit 220 into an electric signal. The image sensor 330 may be manufactured in the form of a complementary metal-oxide-semiconductor (CMOS).

The camera module 10 configured as above may secure a focal length required for long-distance imaging through a plurality of optical path conversion units 120 and 220. In addition, according to this example, the camera module 10 may become relatively thinner by forming the optical path of the camera module 10 in a direction intersecting the first optical axis C1.

In the camera module 10 according to this example, by individually coupling the first assembly 100 to the third assembly 300, the optical axis between the optical elements (e.g., the first optical path conversion unit 120, the lens module 130, and the second optical path conversion unit 220) of the camera module 10 may be more accurately adjusted and aligned.

Figure 2:
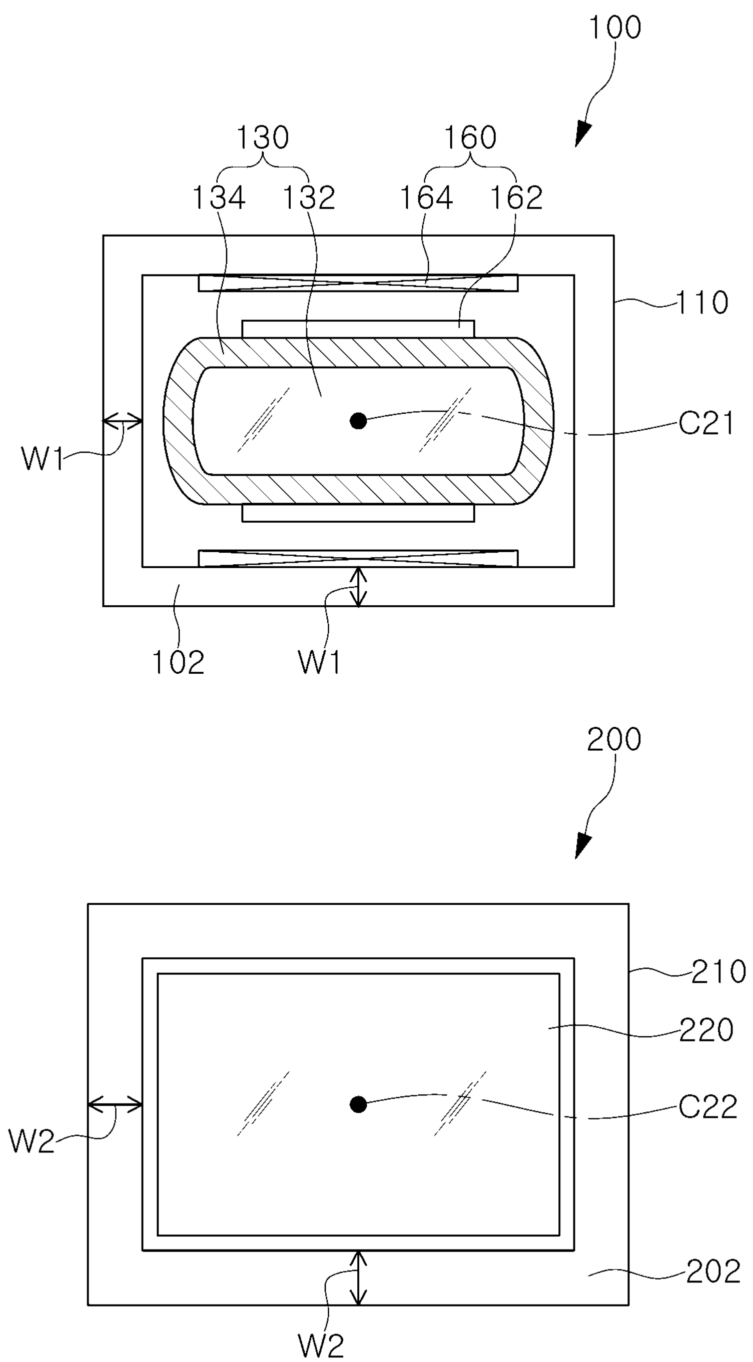
FIG. 2 provides plan views of a first bonding portion of a first assembly and a second bonding portion of a second assembly illustrated in FIG. 1.

The coupling structure of the first assembly and the second assembly will be described with reference to FIGS. 2 to 4.

The first assembly 100 and the second assembly 200 may include a configuration for mutual coupling. For example, the first assembly 100 may include a first bonding portion 102 and the second assembly 200 may include a second bonding portion 202.

The first and second bonding portions 102 and 202 may be formed on the first and second housings 110 and 210, respectively. For example, the first bonding portion 102 may be formed on one end of the first housing 110, and the second bonding portion 202 may be formed on one end of the second housing 210. The first bonding portion 102 and the second bonding portion 202 may be substantially formed to be flat in a direction intersecting an optical axis C21 of the lens module 130 and an optical axis C22 in an incident direction of the second optical path conversion unit 220.

The first and second bonding portions 102 and 202 may be formed to have a predetermined width along the edges of the first and second housings 110 and 210. For example, the first bonding portion 102 may be formed to have a first width W1 along an edge of one end of the first housing 110, and the second bonding portion 202 may be formed to have a second width W2 along an edge of one end of the second housing 210. The first width W1 and the second width W2 may be substantially the same as the thickness of the first housing 110 and the second housing 210. However, the first and second widths W1 and W2 are not necessarily the same as the thicknesses of the first and second housings 110 and 210. For example, the first width W1 and the second width W2 may be greater than the thickness of the first housing 110 and the second housing 210.

The first bonding portion 102 and the second bonding portion 202 may be formed to have different areas (cross-sectional areas, for example). For example, the first width W1 of the first bonding portion 102 and the second width W2 of the second bonding portion 202 may have different sizes. The above-described conditions provide a sufficient bond area between the first bonding portion 102 and the second bonding portion 202, while enabling the relative movement of the second bonding portion 202 relative to the first bonding portion 102, or the relative movement of the first bonding portion 102 relative to the second bonding portion 202.

The first assembly 100 and the second assembly 200 may be coupled via an adhesive member 800 applied to the first and second bonding portions 102 and 202. For example, the first assembly 100 and the second assembly 200 may be coupled by the adhesive member 800 applied between the first bonding portion 102 and the second bonding portion 202 or applied onto sides of the first bonding portion 102 and the second bonding portion 202.

Figure 3:
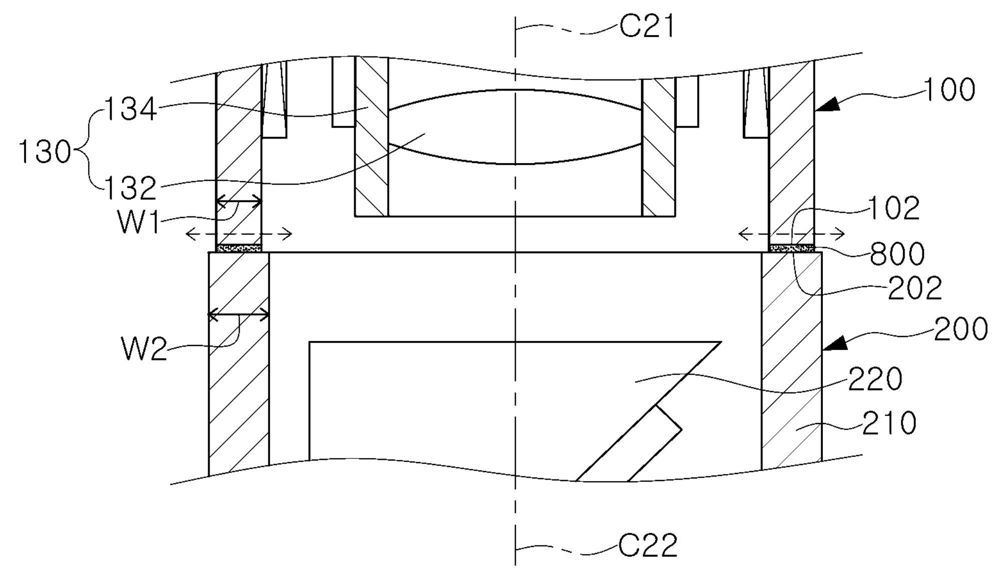
FIG. 3 is a cross-sectional view of a first assembly and a second assembly.
Figure 4:
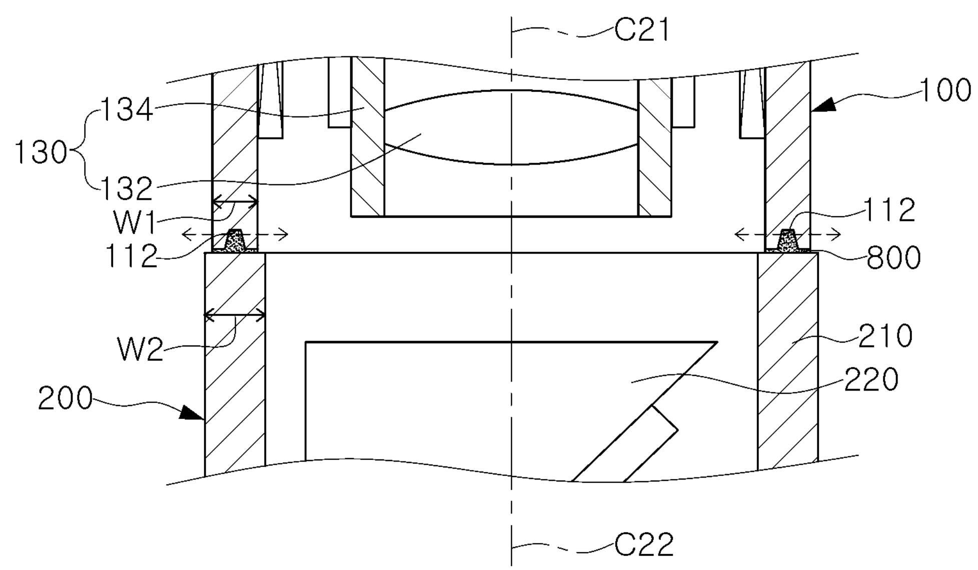
FIG. 4 is a combined cross-sectional view of a first assembly and a second assembly according to different forms.

As illustrated in FIG. 3, the first assembly 100 and the second assembly 200 may be relatively movable to enable optical axis alignment. For example, the first assembly 100 or the second assembly 200 may move in a direction intersecting the optical axes C21 and C22 in a state in which the first bonding portion 102 and the second bonding portion 202 are in contact with each other or in a state in which the adhesive member 800 is applied between the first bonding portion 102 and the second bonding portion 202. Movement of the first assembly 100 and the second assembly 200 may enable alignment between the optical axis C21 of the lens module 130 and the incident direction optical axis C22 of the second optical path conversion unit 220. For example, the optical axis C21 of the lens module 130 and the incident direction optical axis C22 of the second optical path conversion unit 220 may be matched by moving the first assembly 100 or the second assembly 200 in the width direction of the first and second bonding portions 102 and 202.

The first bonding portion 102 and the second bonding portion 202 may include a configuration for suppressing penetration of the adhesive member 800 into the interior or increasing a contact area with the adhesive member 800. For example, a groove 112 for accommodating the adhesive member 800 may be formed in the first bonding portion 102 or the second bonding portion 202, as illustrated in FIG. 4. For reference, although it is illustrated that the groove 112 is formed only in the first bonding portion 102 in FIG. 4, a groove may also be formed in the second bonding portion 202.

Figure 5:
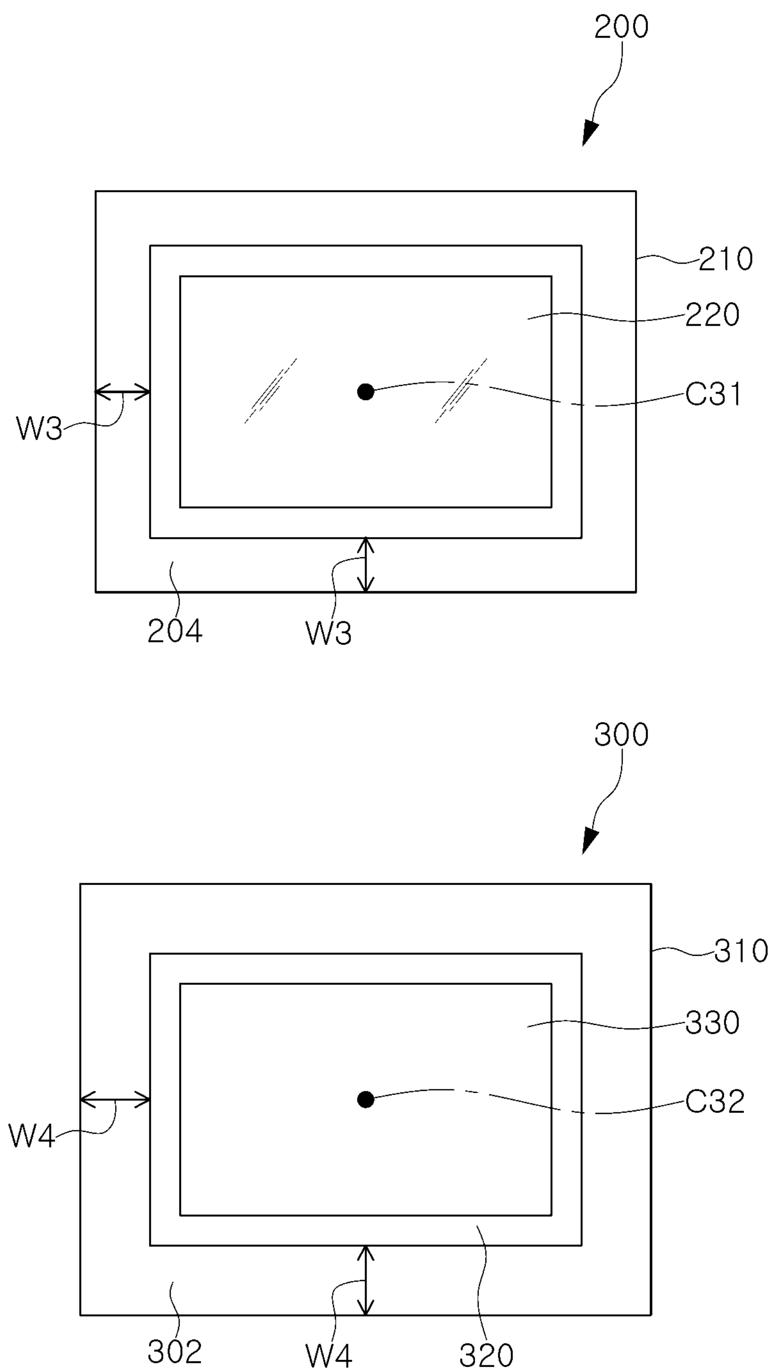
FIG. 5 is a plan view of a third bonding portion of the second assembly and a fourth bonding portion of a third assembly illustrated in FIG. 1.

Next, the coupling structure of the second assembly and the third assembly will be described with reference to FIGS. 5 to 7.

The second assembly 200 and the third assembly 300 may include a configuration for mutual coupling. For example, the second assembly 200 may further include a third bonding portion 204, and the third assembly 300 may include a fourth bonding portion 302.

The third bonding portion 204 and the fourth bonding portion 302 may be formed on the second housing 210 and the third housing 310, respectively. For example, the third bonding portion 204 may be formed on the other end of the second housing 210 (opposite end of the second housing from the second bonding portion 202), and the fourth bonding portion 302 may be formed on one end of the third housing 310. The third bonding portion 204 and the fourth bonding portion 302 may be substantially formed to be flat in a direction intersecting the optical axis C31 in the exit direction of the second optical path conversion unit 220 and the optical axis C32 of the image sensor 330.

The third and fourth bonding portions 204 and 302 may have a predetermined width along the edges of the second and third housings 210 and 310. For example, the third bonding portion 204 may be formed to have a third width W3 along the edge of the second housing 210, and the fourth bonding portion 302 may be formed to have a fourth width W4 along the edge of one end of the third housing 310. The third width W3 and the fourth width W4 may be substantially the same as the thickness of the second housing 210 and the third housing 310. However, the third width W3 and the fourth width W4 are not necessarily the same as the thickness of the second housing 210 and the third housing 310. For example, the third width W3 and the fourth width W4 may be greater than the thickness of the second housing 210 and the third housing 310.

The third bonding portion 204 and the fourth bonding portion 302 may be formed to have different areas (cross-sectional areas, for example). For example, the third width W3 of the third bonding portion 204 and the fourth width W4 of the fourth bonding portion 302 may have different sizes. The above-described conditions provide a sufficient bonding area between the third bonding portion 204 and the fourth bonding portion 302, and may also enable the relative movement of the fourth bonding portion 302 with respect to the third bonding portion 204, or the relative movement of the third bonding portion 204 with respect to the fourth bonding portion 302.

The second assembly 200 and the third assembly 300 may be coupled through an adhesive member 800 applied to the third and fourth bonding portions 204 and 302 as a medium. For example, the second assembly 200 and the third assembly 300 may be coupled by an adhesive member 802 applied between the third bonding portion 204 and the fourth bonding portion 302 or on sides of the third bonding portion 204 and the fourth bonding portion 302.

Figure 6:
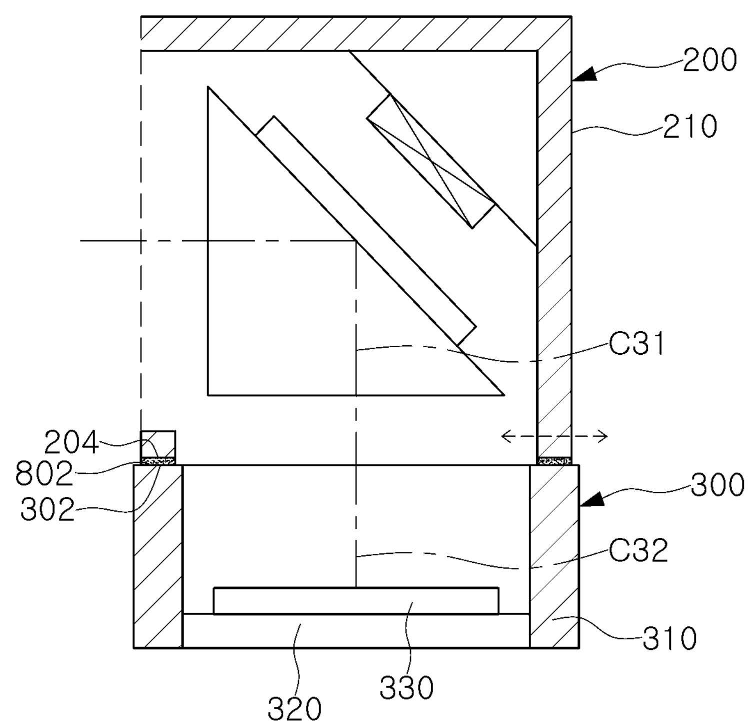
FIG. 6 is a cross-sectional view of a second assembly and a third assembly.
Figure 7:
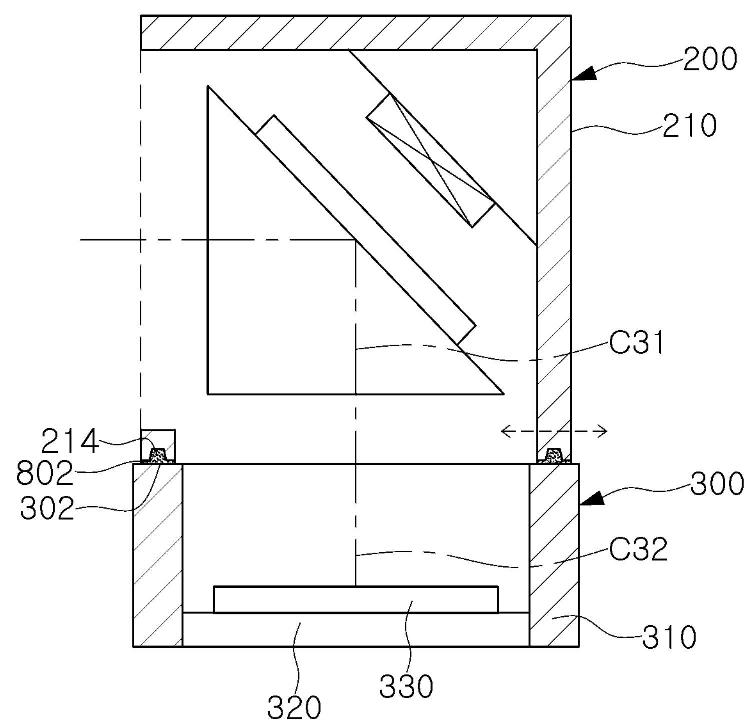
FIG. 7 is a combined cross-sectional view of a second assembly and a third assembly according to different forms.

As illustrated in FIG. 6, the second assembly 200 and the third assembly 300 may be relatively movable to enable optical axis alignment. For example, the second assembly 200 or the third assembly 300 may move in a direction intersecting the optical axes C31 and C32 in a state in which the third bonding portion 204 and the fourth bonding portion 302 abut or in a state in which the adhesive member 802 is applied between the third bonding portion 204 and the fourth bonding portion 302. The movement of the second assembly 200 and the third assembly 300 may enable alignment between the optical axis C31 in the exit direction of the second optical path conversion unit 220 and the optical axis C32 of the image sensor 330. For example, the exit direction optical axis C31 of the second optical path conversion unit 220 and the optical axis C32 of the image sensor 330 may be matched by moving the second assembly 200 or the third assembly 300 in the width direction of the bonding portions 204 and 302.

The third bonding portion 204 and the fourth bonding portion 302 may include a configuration for suppressing penetration of the adhesive member 802 or increasing a contact area with the adhesive member 802. For example, a groove 214 for accommodating the adhesive member 802 may be formed in the third bonding portion 204 or the fourth bonding portion 302, as illustrated in FIG. 7. For reference, although it is illustrated that the groove 214 is formed only in the third bonding portion 204 in FIG. 7, a groove may be formed in the fourth bonding portion 302.

In the camera module 10 configured as above, the first assembly 100 to the third assembly 300 having independent optical elements (first optical path conversion unit 120, second optical path conversion unit 220, and image sensor 330), respectively, may be configured to be separated from each other, thereby improving assembling properties of the optical elements. In addition, the camera module 10 according to this example enables optical axis alignment between optical elements through the first, second, third, and fourth bonding portions 102, 202, 204 and 302 formed on the first assembly 100 to the third assembly 300, respectively, thereby improving the manufacturing yield of the camera module 10.

Figure 8:
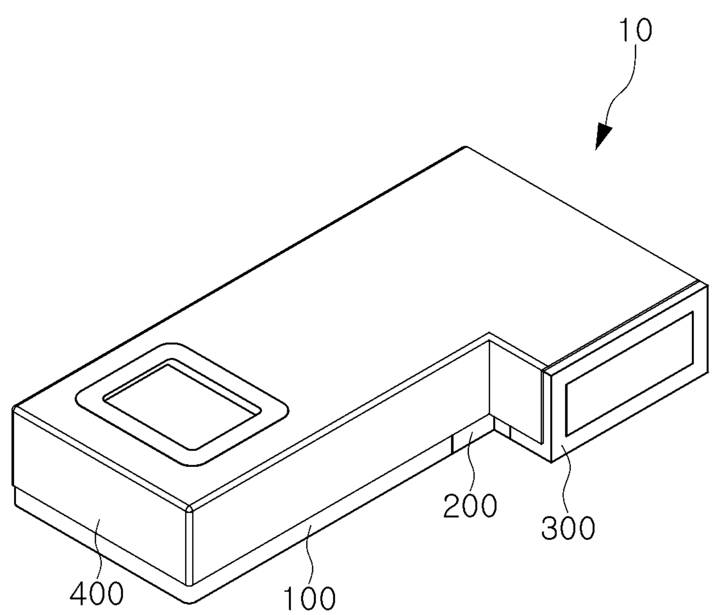
FIG. 8 is a perspective view of a camera module in a state in which a shielding member is coupled.

As illustrated in FIG. 8, the camera module 10 may further include a component for protecting the first assembly 100 to the third assembly 300 from harmful electromagnetic waves. For example, the camera module 10 may further include a shielding member 400 configured to protect two or more of the first assembly 100 to the third assembly 300 from harmful electromagnetic waves. The shielding member 400 may be formed of a metal material. However, the material of the shielding member 400 is not limited to metal. For example, the shielding member 400 may be formed of a resin material containing metal powder.

Figure 9:
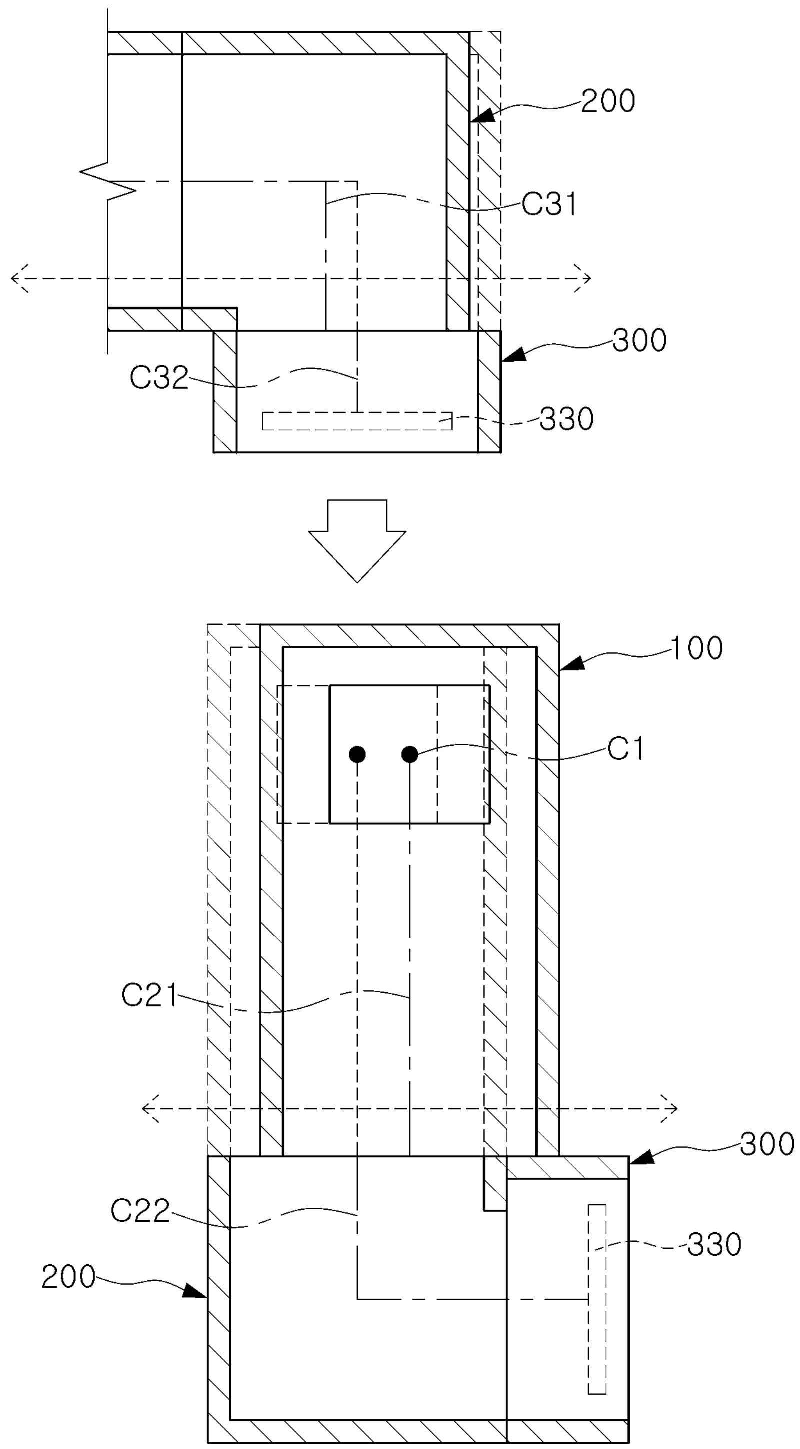
FIG. 9 is a manufacturing process diagram of the camera module illustrated in FIG. 1.

Next, the manufacturing process of the camera module 10 will be briefly described with reference to FIG. 9.

In the camera module 10, the first assembly 100 to the third assembly 300 may be sequentially combined. For example, the camera module 10 may be completed through a first process of combining the second assembly 200 and the third assembly 300, and a second process of combining the first assembly 100 and the second assembly 200. However, the order of combining the first assembly 100 to the third assembly 300 is not limited to the above-described form. For example, in the camera module 10, the order of combination of the first assembly 100 to the third assembly 300 may also change within a range in which optical axis alignment and autofocusing of the first assembly 100 to the third assembly 300 may be obtained.

In the camera module 10, optical axis alignment between optical elements is relatively important. For example, a camera module in which optical axes between optical elements do not match within an error range may not implemented high resolution. Therefore, when manufacturing the camera module 10, it is necessary to check whether the optical axes between the optical elements coincide. Whether or not the optical axes are matched between optical elements may be checked through an image sensor. For example, the optical axis alignment state of optical elements may be confirmed through an electrical signal converted through an image sensor. Accordingly, in the camera module 10 according to this example, bonding between the third assembly 300 including the image sensor 330 and the second assembly 200 may be first performed.

The coupling operation of the second assembly 200 and the third assembly 300 may be performed simultaneously with the optical axis alignment operation between the second assembly 200 and the third assembly 300 or after the optical axis alignment operation therebetween. The optical axis alignment between the second assembly 200 and the third assembly 300 may be obtained through a characteristic comparison between an optical signal irradiated by the second optical path conversion unit 220 of the second assembly 200 and an electrical signal received through the image sensor 330 of the third assembly 300. For example, the optical axis alignment between the second assembly 200 and the third assembly 300 may be performed by moving the second assembly 200 in a direction intersecting the optical axis C32 such that the optical axis C31 of the second assembly 200 coincides with the optical axis C32 of the image sensor 330 in a state in which the third assembly 300 is fixed to an inspection device. The movement of the second assembly 200 may be performed in a state in contact with the third assembly 300, or may be performed in a state separated from the third assembly 300.

When the optical axis C31 of the second assembly 200 and the optical axis C32 of the image sensor 330 coincide with the appropriate movement of the second assembly 200, the second assembly 200 and the third assembly 300 may be joined. For example, when the optical axis C31 of the second assembly 200 and the optical axis S32 of the image sensor 330 match to some extent in a state in which the second assembly 200 is moved by a first size with respect to the optical axis C32 of the image sensor 330, the second assembly 200 and the third assembly 300 may be temporarily bonded by applying an adhesive member between the second assembly 200 and the third assembly 300 or on the side surfaces of the second assembly 200 and the third assembly 300. Thereafter, when the optical axis C31 of the second assembly 200 and the optical axis C32 of the image sensor 330 match within an error range through autofocusing of the second assembly 200, the adhesive member may be completely cured and thus, the second assembly 200 and the third assembly 300 may be firmly coupled.

When the coupling of the second assembly 200 and the third assembly 300 is completed, the first assembly 100 and the second assembly 200 that is provided with the third assembly 300 may be combined. The coupling between the first assembly 100 and the second assembly 200 is similar to the coupling between the second assembly 200 and the third assembly 300.

The coupling operation of the first assembly 100 and the second assembly 200 may be performed simultaneously with the optical axis alignment operation between the first assembly 100 and the second assembly 200 or after the optical axis alignment operation. The optical axis alignment between the first assembly 100 and the second assembly 200 may be obtained through a characteristic comparison between the optical signal irradiated to the first optical path conversion unit 220 of the first assembly 100 and the electrical signal received through the image sensor 330 of the third assembly 300. For example, the optical axis alignment between the first assembly 100 and the second assembly 200 may be performed by moving the first assembly 100 in a direction intersecting the optical axis C22 such that the optical axis C21 of the first assembly 100 coincides with the optical axis C22 of the second assembly 200 in a state in which the combined body of the second assembly 200 and the third assembly 300 is fixed to the inspection device. The movement of the first assembly 100 may be performed in a state in contact with the second assembly 200 or may be performed in a state separated from the second assembly 200.

When the optical axis C21 of the first assembly 100 and the optical axis C22 of the second assembly 200 coincide with the appropriate movement of the first assembly 100, the first assembly 100 and the second assembly 200 may be joined. For example, in a state in which the first assembly 100 is moved by a second size with respect to the optical axis C22 of the second assembly 200, when the optical axis C21 of the first assembly 100 and the optical axis C22 of the second assembly 200 coincide to some extent, the first assembly 100 and the second assembly 200 may be temporarily bonded by applying an adhesive member between the first assembly 100 and the second assembly 200 or on the side surfaces of the first assembly 100 and the second assembly 200. Thereafter, when the optical axis C21 of the first assembly 100 and the optical axis C22 of the second assembly 200 coincide within an error range through autofocusing of the first assembly 100, the adhesive member is completely cured, and the first assembly 100 and the second assembly 200 may be firmly coupled.

In the camera module 10 manufactured through the above process, since the optical axes between the first assembly 100 to the third assembly 300 may be matched within an error range, the defect rate of the product may be reduced, and high resolution may be implemented.

Figure 10:
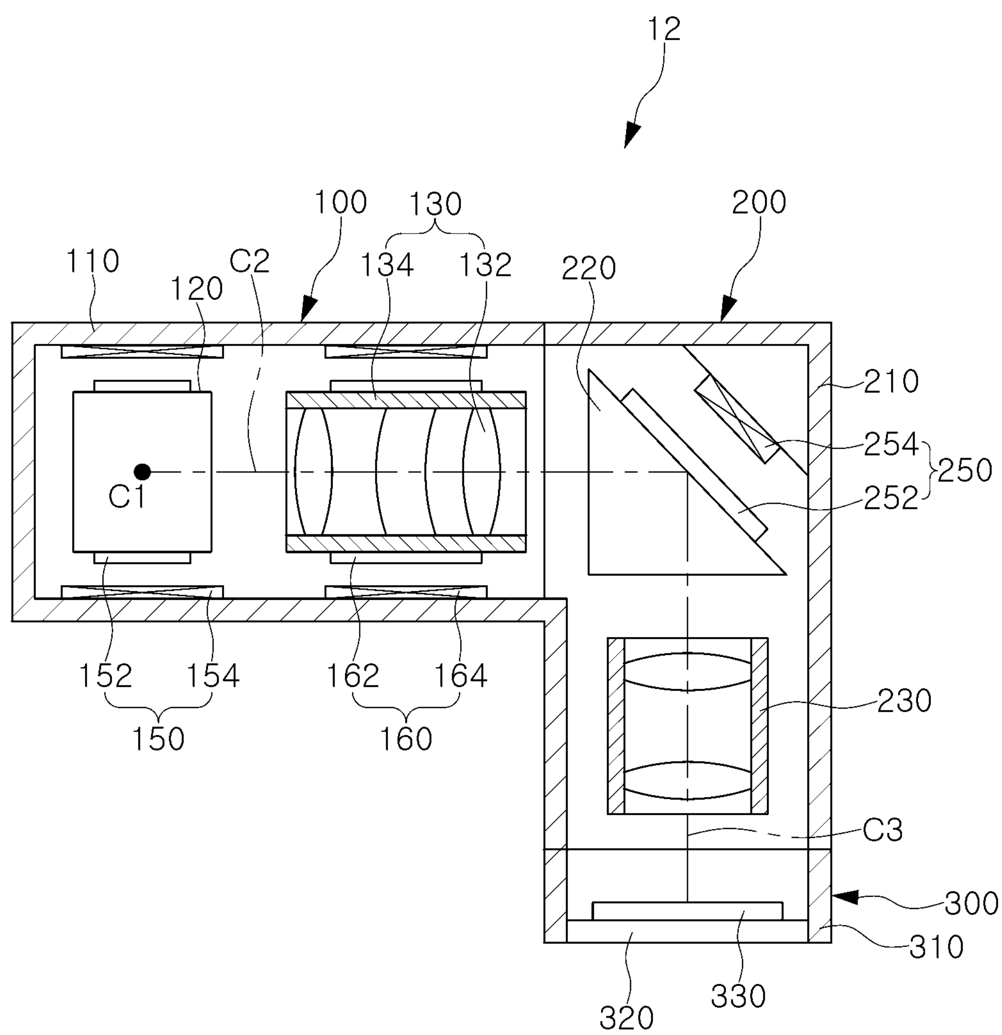
FIG. 10 is a configuration diagram of a camera module according to another example.

Next, a camera module according to another example will be described with reference to FIG. 10. For reference, components that are the same as those of the above-described examples are denoted by the same reference numerals as those of the above-described examples, and detailed descriptions of these components may be omitted.

A camera module 12 according to an example may include a first assembly 100, a second assembly 200, and a third assembly 300. However, the configuration of the camera module 12 is not limited to the first assembly 100 to the third assembly 300. For example, the camera module 12 may further include a shielding member for accommodating the first assembly 100 to the third assembly 300.

The first assembly 100 may include a first housing 110, a first optical path conversion unit 120, and a first lens module 130. However, the configuration of the first assembly 100 is not limited to the above-described configurations. For example, the first assembly 100 may further include a driving unit for driving at least one of the first optical path conversion unit 120 and the first lens module 130.

The first housing 110 is configured to accommodate the first optical path conversion unit 120 and the first lens module 130. For example, the first housing 110 may be formed in a substantially rectangular parallelepiped shape to integrally accommodate the first optical path conversion unit 120 and the first lens module 130 that are sequentially disposed in one direction. At least one surface of the first housing 110 may be formed in a partially open shape. For example, a partial region of one surface of the first housing 110, on which light is incident, and a partial region of one surface thereof, on which light is emitted, may be formed in an open shape.

The first optical path conversion unit 120 is disposed in the first housing 110. The first optical path conversion unit 120 is configured to convert an optical path. For example, the first optical path conversion unit 120 may convert a path of light incident on the first optical axis C1 in the direction of the second optical axis C2. The first optical path conversion unit 120 may be formed in the form of a prism or a reflector. However, the shape of the first optical path conversion unit 120 is not limited to a prism and a reflector.

The first lens module 130 is configured to refract light reflected from a subject to a second lens module 230. The first lens module 130 may include one or more lenses.

The second assembly 200 may include a second housing 210, a second optical path conversion unit 220, and a second lens module 230. However, the configuration of the second assembly 200 is not limited to the above-described configurations. As an example, the second assembly 200 may further include a filter for blocking light of a specific wavelength.

The second housing 210 is configured to accommodate the second optical path conversion unit 220. The second housing 210 is formed in such a manner that the incident surface and the exit surface of the second optical path conversion unit 220 are exposed externally in a state in which the second optical path conversion unit 220 is received therein. For example, at least two side surfaces of the second housing 210 may be partially open, such that light may enter and exit through the incident surface and the exit surface of the second optical path conversion unit 220.

The second optical path conversion unit 220 is disposed in the second housing 210. The second optical path conversion unit 220 is configured to convert the optical path. For example, the second optical path conversion unit 220 may convert a path of light incident on the second optical axis C2 in the direction of the third optical axis C3. The second optical path conversion unit 220 may be formed on a plane, on which the optical path of the camera module 12 substantially intersects the first optical axis C1. For example, the second optical path conversion unit 220 may be configured to refract or reflect light incident on the second optical axis C2 in the direction of the third optical axis C3 intersecting the first optical axis C1. The second optical path conversion unit 220 may be formed in the form of a prism or a reflector. However, the shape of the second optical path conversion unit 220 is not limited to a prism and a reflector.

The second lens module 230 is configured to enable light emitted from the first lens module 130 to be imaged on an image plane. The second lens module 230 may include one or more lenses for determining the focal length of the camera module 12.

The third assembly 300 may include a third housing 310, a substrate 320, and an image sensor 330. However, the configuration of the third assembly 300 is not limited to the above-described configurations.

The third housing 310 is configured to accommodate the substrate 320 and the image sensor 330. For example, a substrate 320 and the image sensor 330 may be disposed inside or on one surface of the third housing 310. The third housing 310 may be formed in a shape of a faceted body with open top and bottom. However, the shape of the third housing 310 is not limited to a faceted body.

The image sensor 330 is disposed on the substrate 320. The image sensor 330 is electrically connected to the substrate 320, and may convert an optical signal incident through the first optical path conversion unit 120, the first lens module 130, the second optical path conversion unit 220, and the second lens module 230 into an electric signal. The image sensor 330 may be manufactured in the form of CMOS.

The camera module 12 configured as described above may secure a focal length required for long-distance imaging through a plurality of optical path conversion units 120 and 220. In addition, since the camera module 12 according to this example includes a plurality of lens modules 130 and 230 disposed at a considerable distance, the focus magnification through distance adjustment between the first and second lens modules 130 and 230 may be adjusted.

As set forth above, a defect rate of the camera module may be reduced, and the performance of the camera module may be improved, through optical axis alignment between the optical path conversion unit and the lens module and between the optical path conversion unit and the image sensor.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:

a first assembly comprising a first optical path conversion unit and a lens module;

a second assembly comprising a second optical path conversion unit configured to refract or reflect light emitted from the lens module in a direction intersecting an optical axis of the lens module, the second assembly being configured to be coupled to the first assembly; and a third assembly comprising an image sensor configured to convert light incident through the second optical path conversion unit into an electrical signal, wherein the first assembly comprises a first bonding portion bonded to the second assembly, and wherein the second assembly comprises a second bonding portion bonded to the first bonding portion.

2. The camera module of claim 1, further comprising a bonding member configured to bond the first bonding portion to the second bonding portion.

3. The camera module of claim 1, wherein the second bonding portion and the first bonding portion are configured to have different sizes.

4. The camera module of claim 1, wherein a groove accommodating an adhesive is disposed in one or both of the first bonding portion and the second bonding portion.

5. The camera module of claim 1, wherein the second assembly comprises a third bonding portion bonded to the third assembly, and wherein the third assembly comprises a fourth bonding portion bonded to the third bonding portion.

6. The camera module of claim 5, further comprising a bonding member configured to bond the third bonding portion to the fourth bonding portion.

7. The camera module of claim 5, wherein the third bonding portion and the fourth bonding portion are configured to have different sizes.

8. The camera module of claim 5, wherein a groove accommodating an adhesive is disposed in one or both of the third bonding portion and the fourth bonding portion.

9. The camera module of claim 1, further comprising a shielding member configured to protect two or more of the first assembly, the second assembly, and the third assembly from harmful electromagnetic waves.

10. A camera module comprising:

a first assembly comprising a first optical path conversion unit and a first lens module;

a second assembly comprising a second lens module and a second optical path conversion unit configured to refract or reflect light incident through the first lens module in a direction intersecting a first optical axis of the first lens module, the second assembly being configured to be coupled to the first assembly; and a third assembly comprising an image sensor configured to convert light incident through the second assembly into an electrical signal, wherein the first assembly comprises a first bonding portion bonded to the second assembly, and wherein the second assembly comprises a second bonding portion bonded to the first bonding portion.

11. The camera module of claim 10, further comprising a shielding member configured to protect two or more of the first assembly, the second assembly, and the third assembly from harmful electromagnetic waves.

12. A camera module comprising:

a first housing having a first opening configured to receive light along a first optical axis and comprising a lens module defining a second optical axis and a first converter configured to direct the light received along the first optical axis to the second optical axis;

a second housing having a second opening configured to receive light along the second optical axis that has passed through the lens module and comprising a second converter configured to direct the light received along the second optical axis to a third optical axis; and a third housing having a third opening configured to receive light along the third optical axis and comprising an image sensor configured to receive the light received along the third optical axis, wherein the first housing comprises a first bonding portion bonded to the second housing, and the second housing comprises a second bonding portion bonded to the first bonding portion.

13. The camera module of claim 12, wherein the first housing has a fourth opening, and the first housing and the second housing are bonded together such that the fourth opening is adjacent to the second opening.

14. The camera module of claim 13, wherein the second housing has a fifth opening, and the second housing and the third housing are bonded together such that the fifth opening is adjacent to the third opening.

* * * * *